No. 616,683. W. W. McALPINE. Patented Dec. 27, 1898.
JACK SCREW.
(Application filed Mar. 30, 1898.)
(No Model.)
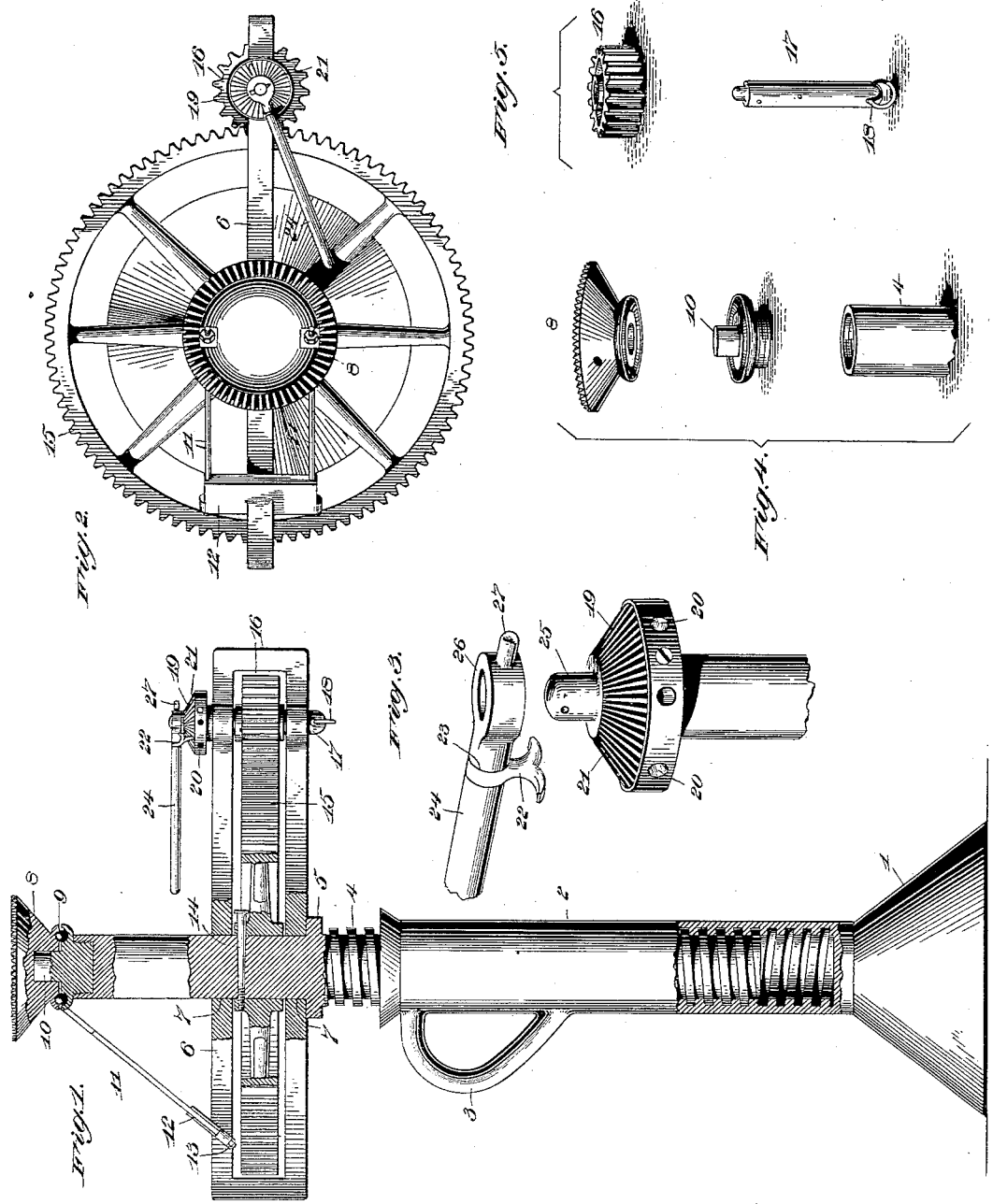

UNITED STATES PATENT OFFICE.

WILLIAM W. McALPINE, OF BOLIGEE, ALABAMA, ASSIGNOR OF ONE-HALF TO A. C. HILL, OF EUTAW, ALABAMA.

JACK-SCREW.

SPECIFICATION forming part of Letters Patent No. 616,683, dated December 27, 1898.

Application filed March 30, 1898. Serial No. 675,744. (No model.)

*To all whom it may concern:*

Be it known that I, WILLIAM W. MCALPINE, a citizen of the United States, residing at Boligee, in the county of Greene and State of Alabama, have invented a new and useful Jack-Screw, of which the following is a specification.

My invention relates to jack-screws or lifting-jacks, and has for its object to provide a simple, compact, durable, and efficient construction, combination, and arrangement of parts whereby an economical application of power may be attained.

Further objects and advantages of this invention will appear in the following description, and the novel features thereof will be particularly pointed out in the appended claims.

In the drawings, Figure 1 is a side view, partly in section, of a jack-screw constructed in accordance with my invention. Fig. 2 is a plan view. Fig. 3 is a detail view of the operating-lever and ratchet detached. Fig. 4 is a detail view of the lifting cap or head and the contiguous parts of the spindle portion of the feed-screw detached. Fig. 5 is a detail view of the driving-pinion and spindle detached.

Similar numerals of reference indicate corresponding parts in all the figures of the drawings.

1 designates a base from which rises a tubular standard 2, preferably provided with a suitable handle 3, and threaded in the bore of the standard is a feed-screw 4, provided at an intermediate point with a bearing-collar 5, upon which rests a gear-frame 6. This gear-frame preferably consists of parallel upper and lower bars having vertically-alined bearings 7, in which the smooth upper or spindle portion of the feed-screw (above the bearing collar or shoulder 5) is mounted for independent movement. Swiveled upon the upper end of the spindle portion of the feed-screw is a cap 8, preferably having a roughened or serrated upper surface, and in the construction illustrated being supported by a roller or ball bearing 9 to reduce to the minimum the friction due to the rotary movement of the spindle, it being obvious that the cap remains stationary (in so far as rotary motion is concerned) during its elevation by the spindle. A reduced terminal portion 10 of the spindle extends centrally into the cap 8 to maintain the latter in its proper position. Also, in order to hold the frame 6 in a fixed position as against rotary motion during the operation of the feed-screw, braces 11 extend therefrom to the cap and are transversely braced, as at 12. The lower ends of the brace-rods are preferably fitted below the plane of the upper bar of the frame with adjusting or tension nuts 13 or other means, whereby an even tension may be maintained upon the brace-rods.

Fixed to the feed-screw by means of a key or, preferably, a pin 14, as shown in the drawings, is a driven gear 15 of large diameter, the same being arranged in a horizontal plane between the upper and lower bars of the frame 6, and meshing with said gear is a driving-pinion 16, having its spindle 17 mounted in bearings in the upper and lower bars of the frame 6 and held from upward displacement by means of a detachable retainer 18. The spindle 17 is fitted above the upper bar of the frame with an enlargement or head 19, having a peripheral series of lever sockets or seats 20, and the upper surface of the head is provided with ratchet-teeth 21 of the double-sided type—namely, square-sided—whereby they may be engaged, as by a double pawl 22, to communicate motion to the pinion-spindle in either direction. The operating-pawl 22 is pivotally mounted or swiveled upon a spindle portion 23 of an operating-lever 24, the latter being fulcrumed upon a reduced extension 25 of the pinion-spindle. Obviously the pawl may be arranged upon either side of the vertical plane of the operating-lever to cause either of its operating extremities to engage the ratchet-teeth, and thus communicate motion to the pinion-spindle in either direction. The lever 24 is removably mounted upon the reduced portion 25 of the spindle and beyond the bearing 26, which is constructed for the reception of said bearing portion 25. The lever is extended to form a pin 27, adapted to fit in the sockets or seats 20 in the periphery of the head 19. Thus when it is desired to turn the pinion 16 without the use of the ratchet or by a positive application of power the lever may be dismounted from the reduced bearing portion 25 and terminally fitted in the desired seat or socket.

From the above description it will be seen that by employing a driven gear of large diameter fixed to the feed-screw and mounted in a vertically-movable frame carried by the feed-screw, while meshing with said gear is a driving-pinion of smaller diameter, with which the operating-lever is connected, I am enabled to attain a leverage or power which is a multiple of that applied to the operating-lever, while the antifriction-bearing, which is provided for the support of the lifting-cap 8, reduces the friction at the point of the communication of pressure from the feed-screw to the lifting element of the apparatus. Furthermore, it will be seen that the construction is simple and that the parts thereof may be suitably proportioned to secure the necessary strength and multiplication of power to accomplish the desired object, and that these and other changes in the form, proportion, and the minor details of construction may be resorted to without departing from the spirit or sacrificing any of the advantages of this invention.

Having described my invention, what I claim is—

1. A lifting apparatus of the class described, having a stationary standard, a movable member mounted upon said standard and having a threaded connection therewith, a frame having a swivel connection with said movable member, a driven gear mounted upon the movable member and having connection therewith to communicate rotary motion thereto, a driving-pinion mounted upon said frame in operative relation with the driven gear, and operating mechanism for the pinion including a ratchet having a toothed upper face, and an operating-lever fulcrumed concentric with the ratchet and having a reversible pawl for engagement with the ratchet-teeth, substantially as specified.

2. A lifting apparatus of the class described, having a stationary standard, a movable member mounted upon said standard and having a threaded connection therewith, a frame having a swivel connection with said movable member, a driven gear mounted upon the movable member and having connection therewith to communicate rotary motion thereto, a driving-pinion mounted upon said frame in operative relation with the driven gear, and operating mechanism for the pinion, including a ratchet having a toothed upper face, and a peripheral series of seats or sockets, and an operating-lever removably fulcrumed concentric with the ratchet and having a reversible pawl for engagement with the ratchet-teeth, and a terminal pin for engagement with said peripheral seats or sockets, substantially as specified.

3. A lifting apparatus of the class described, having an interiorly-threaded tubular standard, a feed-screw mounted in said standard and having an upper smooth-surfaced spindle portion, a frame mounted upon the spindle portion of the feed-screw in contact with a bearing-shoulder thereon, and having spaced upper and lower bars, a driven gear fixed to the spindle portion of the feed-screw between the planes of the bars of the frame, a driving-pinion having its spindle mounted in bearings on the frame, and arranged in operative relation with the gear, and operating mechanism for the pinion, including a ratchet having a toothed upper face and a peripheral series of seats or sockets, and an operating-lever removably fulcrumed concentric with the ratchet, and having a reversible pawl for engagement with the ratchet-teeth, and a terminal pin for engagement with said peripheral seats or sockets, substantially as specified.

4. A lifting apparatus of the class described, having an interiorly-threaded tubular standard, a feed-screw mounted in said standard and having an upper smooth-surfaced spindle portion, a frame loosely mounted upon said spindle portion for axial movement with the feed-screw, a cap swiveled upon the upper end of the feed-screw, bracing devices connecting the cap with the frame to secure the latter against rotary movement with the feed-screw, a driven gear fixed to the feed-screw contiguous to the plane of the frame, a driving-pinion mounted upon the frame and meshing with the gear, and operating devices for the pinion, substantially as specified.

In testimony that I claim the foregoing as my own I have hereto affixed my signature in the presence of two witnesses.

WILLIAM W. McALPINE.

Witnesses:
J. W. PERRY,
HENRY T. KIRKLAND.